US006932742B2

(12) United States Patent
Jung et al.

(10) Patent No.: US 6,932,742 B2
(45) Date of Patent: Aug. 23, 2005

(54) METHOD OF AND APPARATUS FOR COMPENSATING FOR THE INFLUENCE OF CHANGES OF ROTATIONAL SPEED UPON THE CHARACTERISTIC CURVE OF A CLUTCH

(75) Inventors: Mario Jung, Sinzheim (DE); Jens Martin, Ottersweier (DE); Thomas Jäger, Meckenbeuren (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/326,798

(22) Filed: Dec. 20, 2002

(65) Prior Publication Data

US 2003/0144110 A1 Jul. 31, 2003

Related U.S. Application Data

(63) Continuation of application No. PCT/DE01/02157, filed on Jun. 7, 2001.

(30) Foreign Application Priority Data

Jun. 23, 2000 (DE) .......................................... 100 30 840

(51) Int. Cl.[7] .............................................. F16D 48/06
(52) U.S. Cl. ..................... 477/175; 477/180; 192/85 C; 192/103 F; 192/111 A
(58) Field of Search ................................ 477/175, 176, 477/180; 192/85 C, 91 R, 103 F, 111 A

(56) References Cited

U.S. PATENT DOCUMENTS

| | | | | |
|---|---|---|---|---|
| 4,468,988 A | * | 9/1984 | Hiramatsu | 477/65 |
| 4,646,891 A | * | 3/1987 | Braun | 477/175 |
| 4,854,433 A | * | 8/1989 | Tellert | 477/86 |
| 4,986,401 A | * | 1/1991 | Petzold et al. | 477/176 |
| 5,121,820 A | * | 6/1992 | Brown et al. | 192/3.3 |
| 5,295,915 A | | 3/1994 | Friedmann | |
| 5,322,150 A | * | 6/1994 | Schmidt-Brucken et al. | 477/176 |
| 5,450,934 A | | 9/1995 | Maucher | |
| 5,632,706 A | | 5/1997 | Kremmling et al. | |
| 5,993,352 A | * | 11/1999 | Kosik et al. | 477/74 |
| 6,223,874 B1 | * | 5/2001 | Wheeler | 192/103 F |
| 2004/0102287 A1 | * | 5/2004 | Eggert et al. | 477/84 |

FOREIGN PATENT DOCUMENTS

| | | |
|---|---|---|
| DE | 195 40 921 A 1 | 1/1997 |
| DE | 198 12 629 A 1 | 9/1999 |
| EP | 0 760 442 A1 | 3/1997 |

* cited by examiner

Primary Examiner—Richard M. Lorence
(74) Attorney, Agent, or Firm—Darby & Darby

(57) ABSTRACT

The invention relates to a method of compensating for the influence of changes of speed of a rotary component of an adjustable clutch upon the control torque characteristic curve of the clutch in the power train of a motor vehicle wherein the clutch operates between the rotary output element of the engine or another prime mover and a rotary input element of a change-speed transmission. The method includes the steps of monitoring the rotational speed of the clutch and varying the required positions of a mobile adjusting member for the clutch as a function of changes of the monitored rotational speed. The invention also relates to the power train wherein the influence of changes of rotational speed of the aforesaid component upon the characteristic curve can be varied in accordance with the novel method.

15 Claims, 2 Drawing Sheets

METHOD OF AND APPARATUS FOR COMPENSATING FOR THE INFLUENCE OF CHANGES OF ROTATIONAL SPEED UPON THE CHARACTERISTIC CURVE OF A CLUTCH

CROSS-REFERENCE TO RELATED CASES

This application is a continuation of International (PCT) application No. PCT/DE01/02157, filed Jun. 7, 2001, which claims the priority of German patent application Serial No. 100 30 840.6, filed Jun. 23, 2000. The disclosures of the aforesaid priority applications, as well as that of each U.S. and/or foreign patent and/or patent application identified in the specification of the present application, is incorporated herein by reference.

BACKGROUND OF THE INVENTION

The invention relates to improvements in methods of and in means for compensating for the influence of rotational speed upon the control torque characteristic curve of a clutch, such as the friction clutch between the prime mover and the change-speed transmission in the power train of a motor vehicle.

It is becoming customary to equip the power trains of motor vehicles with automated clutches, especially electronically operated clutches which are actuated by control units equipped with microprocessors having information storing facilities. Such clutches contribute not only to the comfort of operation but also to a reduction of fuel consumption, especially when they are called upon to transmit torque to automated transmissions.

An important parameter for the operation and/or controlling of automatic clutches is the so-called control torque characteristic curve which determines the desired or required path for an adjusting member in dependency upon the torque, especially slip torque, which is to be transmitted by the clutch. Such characteristic curve, also known as setting torque characteristic curve, changes gradually during the life span of the clutch, e.g., as a result of wear and/or similar influences; in order to compensate for such gradual influences, the clutch is monitored automatically at predetermined operating points and is actualized or adapted accordingly.

A short-lasting change of the control torque characteristic curve, for example, a change lasting only a few seconds, is not likely to be detected by the control system for the clutch. This can cause serious problems because numerous clutches are highly likely or bound to develop changes of their control torque characteristic curves, for example, changes which are attributable to changes of rotational speed of a rotary part of the clutch. Failure to detect changes of characteristic curve can result in unsatisfactory operation of the clutch and can adversely affect the comfort of the operator of and/or passenger(s) in the motor vehicle during shifting of the transmission into different speeds but particularly during setting of the motor vehicle into motion.

OBJECTS OF THE INVENTION

An object of the present invention is to contribute to the comfort of the occupant(s) of motor vehicles by compensating for the influence of the rotational speed of a rotary part of the clutch upon its control torque characteristic curve.

Another object of the invention is to provide a novel and improved method of compensating for the influence of changes of rotational speed of a component part of an adjustable clutch upon the control torque characteristic curve of the clutch.

A further object of the invention is to provide a novel and improved power train for use in motor vehicles.

An additional object of the invention is to provide a novel and improved arrangement which can compensate for the influence of changes of rotational speed of a rotary component of an adjustable friction clutch.

Still another object of the instant invention is to provide a novel and improved combination of a friction clutch, an actuating device therefor, a control unit associated with the clutch and with the engine or another prime mover of a motor vehicle, and various sensors arranged to monitor variable characteristics of several constituents in the power train of a motor vehicle.

A further object of the invention is to provide a novel and improved actuator for the clutch in the power train of a motor vehicle.

SUMMARY OF THE INVENTION

One of several features of the present invention resides in the provision of a method of compensating for the influence of changes of rotational speed of an adjustable clutch upon the control torque characteristic curve of the clutch. The method comprises the steps of monitoring the rotational speed of the clutch, and varying required positions of a mobile adjusting member for the clutch in dependency upon changes of the monitored rotational speed. The required positions of the mobile adjusting member for the clutch correspond to the control torque characteristic curve.

The control torque characteristic curve is varied in dependency upon changes of rotational speed of the clutch, and the positions of the mobile adjusting member include a zero position in which the clutch is fully engaged. The varying step includes varying the zero position of the mobile adjusting member; such varying step can include taking into consideration a mechanically effected compensation for rotational speed-dependent changes of the zero position of the mobile adjusting member. The changes of zero position can be carried out as a function of first and second powers of the rotational speed of the clutch.

The clutch can constitute an engageable and disengageable clutch in the power train of a motor vehicle and the step of varying the required positions of the mobile adjusting member is or can be carried out only in the course of at least one of (a) starting a prime mover (such as an internal combustion engine) for the clutch and (b) engagement of the clutch subsequent to shifting of a clutch-driven change-speed transmission of the power train into a selected speed.

Another feature of our present invention resides in the provision of a novel and improved power train for use in a motor vehicle. The power train comprises a prime mover having a variable-speed rotary output element (such as the crankshaft of an internal combustion engine), an adjustable clutch which is rotatable by the output element of the prime mover at a plurality of different speeds, signal-transmitting sensor means for monitoring at least one variable parameter including the rotational speed of the clutch, an adjustable actuator for the clutch, and control means arranged to receive signals from the sensor means and to adjust the actuator as a function of the aforediscussed variable control torque characteristic curve denoting information pertaining to a required position of the actuator as a function of signals which are transmitted by the sensor means. The control means includes means for storing information pertaining to changes of the characteristic curve as a function of changes of the speed of the clutch, and means for altering the required position of the actuator at least in dependency upon the stored information.

A presently preferred actuator comprises a motor (e.g., an electric motor), a cylinder having a so-called breather or equalizing bore or hole, a piston which is reciprocable in the cylinder past the breather hole, setting means (such as a piston rod) which serves to connect the piston with the motor and is arranged to repeatedly move the piston past the breather hole, and fluid-operated means for coupling the piston with a mobile part (e.g., a pivotable lever) of the clutch. The altering means is further arranged to alter the required position of the actuator in dependency upon the rotational speed of the clutch during the last movement of the piston past the breather hole.

The fluid which can be admitted into or expelled from the cylinder through the breather hole is preferably oil or another hydraulic fluid.

The aforementioned coupling means can comprise a second cylinder, a conduit which connects the second cylinder with the first mentioned cylinder, and a second piston which is reciprocable in the second cylinder and is connected with the mobile part of the clutch.

The altering means of the control means is or can be arranged to effect a change $\Delta s$ of the required position of the actuator in accordance with the equation $$\Delta s = a \times n_M 2 + b \times n_M - (b_2 \times n_s 2 + b_1 \times n_s)$$

wherein a, b, $b_1$ and $b_2$ are constants, $n_M$ is the prevailing rotational speed of the clutch, and $n_s$ is that rotational speed which the clutch assumes during the last movement of the piston past the breather hole.

The clutch is operative to transmit a plurality of different torques, and the altering means can be arranged to alter the required position only as a function of that rotational speed which the clutch assumes during the last movement of the first mentioned piston past the breather hole.

In accordance with a modification, the altering means can be arranged to effect a change $\Delta s$ of the required position when the clutch transmits the smallest torque of the aforementioned plurality of different torques and in accordance with the equation $$\Delta s = -(b_2 \times n_s 2 + b_1 \times n_s),$$

wherein $b_1$ and $b_2$ are constants and $n_s$ is the rotational speed of the clutch during the last movement of the first mentioned piston past the breather hole.

The clutch can constitute a friction clutch.

Such friction clutch is preferably an automated clutch, and the changes of speed of the clutch preferably include rapid changes, e.g., those in the range of one or more seconds.

The sensor means of the power train can include means for monitoring at least one of a plurality of additional parameters (namely in addition to rotational speed of the clutch), e.g., the rotational speed of the output element of the prime mover, the position of a multiposition gear selecting member of the transmission which receives torque from the clutch, and the position of a multiposition pedal in the motor vehicle. If the prime mover is an internal combustion engine, the sensor means can further include means for monitoring the pressure at the fuel-admitting port of the engine.

An important advantage of the improved method is that it renders it possible to take into consideration rapid changes of rotational speed of a rotary component part of the clutch. This can be accomplished in that the position of the setting means for the clutch is altered accordingly. Such method ensures that the control torque characteristic curve, which can already exhibit a dependency of torque to be transmitted by the clutch upon the rotational speed, and which is the basis of the overall regulation of operation of the clutch, can remain in existence and is correctable by resorting to simple correcting software which can be memorized in the form of functions or characteristic fields. The necessary speed-dependent corrections can be taken up at the test stand in a vehicle- and/or clutch-specific manner and stored in the software.

The invention can be put to use in conjunction with all types of automated clutches the operation of which, and especially their control torque characteristic curve, depends upon the rotational speed. It has been ascertained that the present invention can be embodied with particular advantage in a motor vehicle having a power train which employs an automated clutch operatively connected with a control unit receiving signals from sensor means which monitors or monitor one or more operational parameters of the power train. The sensor means can be of conventional design, and this also applies for the construction of the transmission or any other device which is operatively connected with and can receive (when necessary) torque from the improved clutch.

The novel features which are considered as characteristic of the invention are set forth in particular in the appended claims. The improved power train itself, however, both as to its construction and the modes of constructing, assembling and operating the same, together with numerous additional important, desirable and advantageous features and attributes thereof, will be best understood upon perusal of the following detailed description of certain presently preferred specific embodiments with reference to the accompanying drawing.

DESCRIPTION OF PREFERRED EMBODIMENTS

Figure 1:
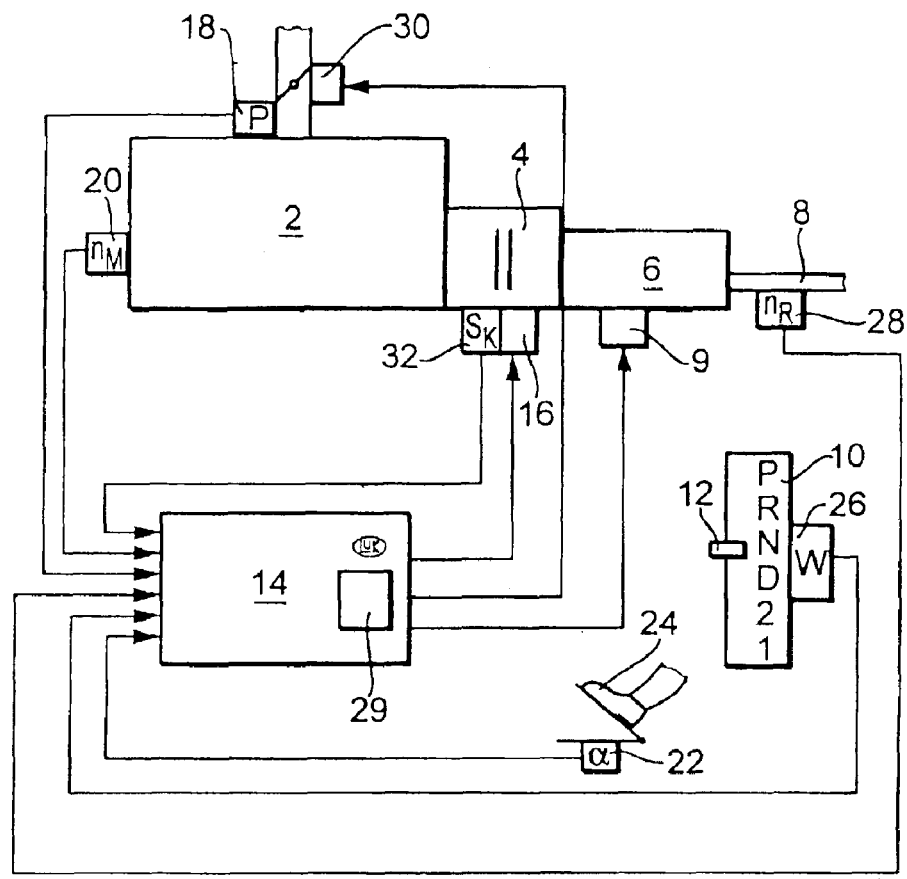
FIG. 1 is a diagrammatic view of a power train which is installed in a motor vehicle and wherein the influence of changes of rotational speed of a component part of the clutch upon the control torque characteristic curve of the clutch is compensated for in accordance with the method of the present invention.

FIG. 1 is a diagrammatic view of the power train of a motor vehicle. wherein an internal combustion engine 2 can drive a change-speed transmission or gearbox 6 by way of a friction clutch 4, e.g., a clutch having a clutch disc or clutch plate arranged to drive the input shaft of the transmission when driven by a pressure plate and a counterpressure plate. Reference may be had, for example, to commonly owned U.S. Pat. No. 5,450,934 granted Sep. 19, 1995 to Paul Maucher for "FRICTION CLUTCH". The character 8 denotes the output shaft of the transmission 6; this output shaft can drive the front and/or the rear wheels of the motor vehicle by way of a differential, not shown.

The transmission 6 can constitute a standard manually shiftable gearbox, an automated gearbox, an infinitely variable speed transmission with two sheaves and an endless belt or chain trained over the sheaves (see, for example, commonly owned U.S. Pat. No. 5,295,915 granted Mar. 22, 1994 to Oswald Friedmann for "CONTINUOUSLY VARIABLE SPEED TRANSMISSION"), or any other transmission which is set up to receive torque from an engine or another prime mover by way of an engageable/disengageable clutch. The illustrated transmission 6 is a manually shiftable automated gearbox. The means for shifting (actuating) the transmission 6 includes a control device 9 which is operable, in a manner known per se, by a gear selector unit 10 by way of a lever 12 and a control unit 14.

The clutch 4 can employ the aforementioned clutch disc with friction linings between the pressure plate and the counterpressure plate, and an adjustable actuator 16 which is operable hydraulically (FIG. 3), electrically, electrohydraulically or in any other suitable manner and can pivot a lever 54 (FIG. 3) or another mobile part of the clutch.

The power train of FIG. 1 further includes a plurality of sensors which serve to monitor certain parameters and transmit signals to the corresponding inputs of the control unit 14. The illustrated sensors include a pressure sensor 18 which monitors the pressure at the suction intake of the engine 2, an RPM sensor 20 which monitors the rotational speed $n_M$ of the crankshaft (output shaft) of the engine, a sensor 22 which monitors the angular position (see the angle α) of a gas pedal 24, a sensor 26 which serves to monitor the position of the lever 12 of the gear selector unit 10 for the transmission 6, and a further RPM sensor 28 which monitors the rotational speed $n_R$ of the output shaft 8 of the transmission 6.

The control unit 14 can be of conventional design; the one shown in FIG. 1 comprises a microprocessor and an associated memory 29 which stores characteristic fields or programs serving to regulate the operation of actuators such as a load selector 30 for the engine 2, the selector 16 for the clutch 4 as well as the control device 9 for the transmission 6. The individual actuators can be designed and constructed in such a way that their positions are directly known in the control unit 14; for example, they can include or constitute electric motors. However, it is also possible to utilize other suitable position selecting or ascertaining means such as, for example, a position indicator 32 which determines the position of the clutch actuator 16 and transmits corresponding signals to the control unit 14.

The constructions and modes of operation of the heretofore described component parts of the power train shown in FIG. 1 are known per se and, therefore, the mode of operation of such power train will not be described in great detail. The operator of the motor vehicle controls the pedal 24 as well as the selector 12 to thus determine the mode of operation of the motor vehicle including the direction of travel and others. The control unit 14 transmits corresponding signals to the load selector 30 for the engine 2, to the actuator 16 for the clutch 4 and to the control device 9 for the transmission 6 to thus ensure proper cooperation between the parts 2, 4, 6 in accordance with (i.e., as a function of) signals furnished to the control unit by the above-enumerated sensor means. The purpose of the just described mode of operation of the power train is to ensure a comfortable ride for the occupant(s) of the motor vehicle.

Figure 2:
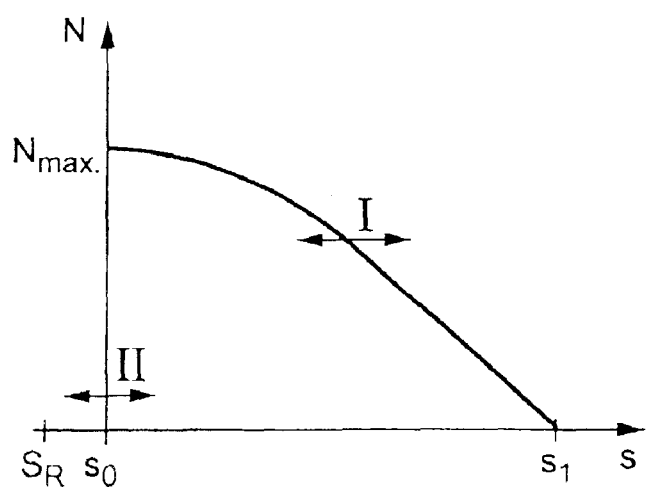
FIG. 2 is a coordinate system which shows the control torque characteristic curve of the clutch, wherein the positions of an adjustable actuator for the clutch are shown along the abscissa and the slip torque transmittable by the clutch is measured along the ordinate.

For example, the memory (29) of the control unit 14 for the clutch 4 can store a control torque characteristic curve which is the basis of start of operation of the clutch and which determines the slip torque of the clutch as a function of (i.e., in dependency upon) the desired or required position of a setting member (see the member 40 in FIG. 3) of the clutch. An example of such control torque characteristic curve is shown in the coordinate system of FIG. 2. The position s of the setting member is indicated along the abscissa, and the magnitude of torque N being transmitted by the clutch 4 (i.e., the magnitude of the slip torque being transmitted by the clutch) is measured along the ordinate. The character $s_1$ indicates the clutch 4 in the fully disengaged position or condition, and the clutch is fully engaged as $s_0$. The character $S_R$ denotes a reference position of the clutch 4 relative to which the positions s are spaced apart by distances covered by the setting member. For example, the reference position $S_R$ can be defined or established by a suitable abutment or stop, not shown.

For reasons of quality of regulation, of the wear upon the clutch 4 and the energy consumption of the actuator 16, the magnitude of transmittable clutch torque (slip torque) should not exceed the then required value but such torque should be selected by consideration of the required safety factor to prevent undesirable slippage of the clutch. The required torque to be transmitted is dependent upon the desire (preference) of the operator of the motor vehicle as indicated by the position of the pedal 24 and, for example, on the load upon the engine 2 (as ascertained by the sensor 18) and possibly upon one or more additional operational parameters such as the RPM (see the sensor 20) of the rotary output element of the engine.

The control torque characteristic curve of the clutch 4 exerts a critical or primary influence upon the comfort to the occupant(s) of the motor vehicle and upon the comfort of carrying out the shifting operations. The control torque characteristic curve of the clutch 4 varies during the useful life of the clutch and is actualized (i.e., adjusted or updated), e.g., in dependency upon the extent of wear, in the event of a predetermined engine torque, at full engagement or disengagement of the clutch and/or under certain other circumstances. Such adjustment or actualization can be carried out in a manner known per se.

At the present time, rapid or instantaneous changes of the control torque characteristic curve, such as those attributable, for example, to the design of the clutch based upon the availability of space for installation of the clutch in a motor vehicle, and caused by the rotational speed, are not recognized and are not considered. This can create problems in actual use of the motor vehicle, particularly as concerns the comfort to the occupant(s) while the vehicle is being set in motion and/or during shifting of the transmission into different gears, as well as undesirable unintended slippage of the clutch.

Extensive experiments indicate that, depending upon the construction of the clutch, the desired position s of the actuator for the clutch, i.e., the desired extent of movement to be carried out from the reference position $S_R$ in order to permit the transmission of predetermined torque, increases or decreases in dependency upon the rotational speed of the clutch or the crankshaft of the engine if the clutch is attached to the crankshaft. This can entail, for example, the development of two different influence factors, namely: Firstly, the control torque characteristic curve is shifted, in dependency upon the rotational speed, in the directions indicated in FIG. 2 by the double-headed arrow I, for example, to higher positions in response to increasing rotational speed, i.e., to greater adjustment distances (such shifting can also depend on the then existing slip torque). Secondly, the zero position of the clutch (i.e., the position $s_0$ in which the clutch is fully engaged and the clutch disengaging system is not being acted upon by any forces) changes, for example, due to a shift in the positions of the prongs of the diaphragm spring in dependency upon the rotational speed (see the double-headed arrow II in FIG. 2).

In accordance with the present invention, the aforediscussed and, if necessary, other rotational speed-dependent changes of the control torque characteristic curve which are effective instantaneously are compensated for in that the control torque characteristic curve which is memorized in the control unit 14 is altered (modified) in accordance with influences of rotational speed which are measured at a test stand or those arrived at by calculation. The changes $\Delta s$ can be stored in the memory 29 of the control unit 14 as a rotational speed-dependent function $\Delta s = f(n_M)$ ($n_M$ = rotational speed of the engine or of the clutch) or in the form of an input-output map. Interpolation is being resorted to in connection with point-by-point determination of $\Delta s$. Due to the instantaneous change of the control torque characteristic curve which takes place in accordance with the then prevailing rotational speed and in dependency upon those changes which are stored in the memory, it is now possible to prevent or avoid uncomfortable, too hard or too soft changes of shifting or an uncomfortable starting or an undesirable slippage of the clutch.

For example, those changes which are required to compensate for the above enumerated changes of the required distance and/or of the required position can be expressed and/or approximated by resorting to the following expressions:

1. Rotational speed-dependent shifting of the characteristic curve:

$$\Delta s_1 = a_2 \times n_M 2 + a_1 \times n_M \quad (1)$$

wherein $a_1$ and $a_2$ are constants and $n_M$ is the rotational speed of the clutch or of the engine.

2. Rotational speed-dependent change of the zero position of the clutch:

$$\Delta s_2 = b_2 \times n_M 2 + b_1 \times n_M \quad (2)$$

wherein $b_1$ and $b_2$ are constants.

3. The following applies for the overall change:

$$\Delta s = \Delta s_1 + \Delta s_2 = a \times n_M 2 + b \times n_M (1) + (2) = (3)$$

It will be appreciated that one can also resort for approximation to relationships other than polynomials of the second degree, for example, to third-degree polynomials.

Figure 3:
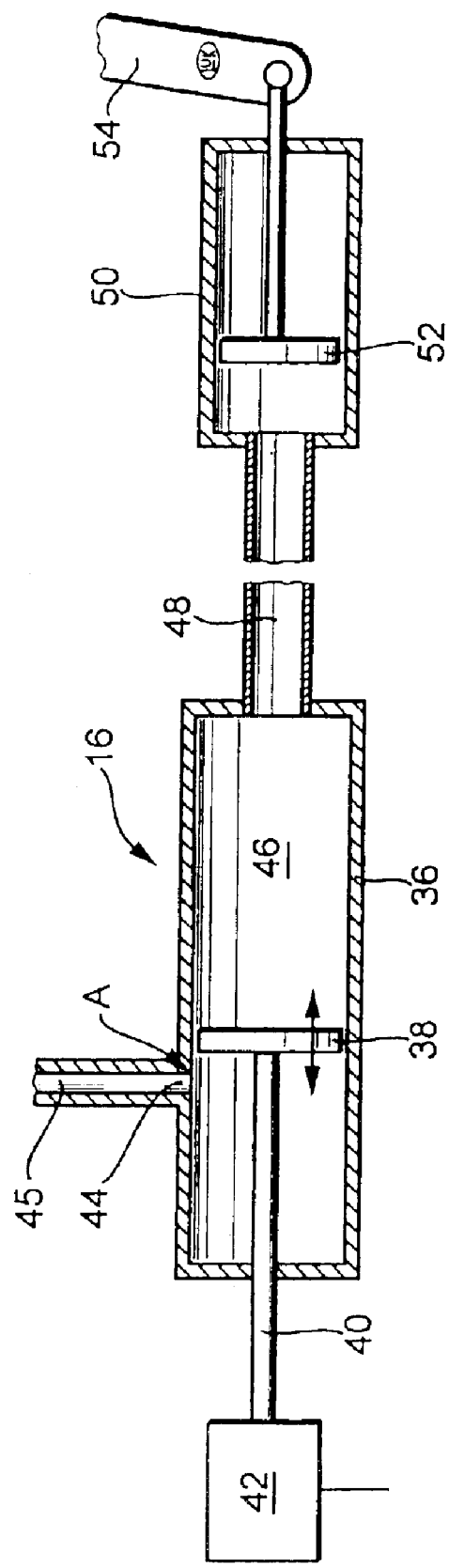
FIG. 3 is a greatly enlarged partly sectional view of a fluid-operated actuator for the clutch.

4. Rotational speed-dependent change of zero position of the clutch with compensating arrangement (equalizing or breather bore or hole):

A presently preferred and widely utilized clutch actuator 16 is shown in FIG. 3. This actuator comprises a cylinder 36 containing a supply of hydraulic fluid and confining a reciprocable piston 38 having a piston rod (setting means) 40 reciprocable by an electric motor 42. The latter is operated by the control unit 14. The cylinder 36 is provided with a breather or equalizing bore or hole 44 which is connected to a (fluid supply) container or vessel (not shown) by a conduit 45. The plenum chamber 46 of the cylinder 36 communicates with one chamber of a cylindrical actuating device 50 of the clutch 4 by way of a conduit 48. The device 50 confines a reciprocable piston 52 which is articulately connected to the mobile clutch disengaging lever (motion transmitting member) 54.

When the piston 38 is moved to the position A of FIG. 3, it assumes a so-called breathing or required (prescribed) position. If the piston 38 is moved beyond the position A in a direction to the right (as viewed in FIG. 3), the pressure of fluid in the chamber 46 rises and the piston 52 causes the motion transmitting member 54 to actuate the clutch 4. The position A of the piston 38 corresponds to the (fully engaged) position $s_0$ of the clutch 4.

It will be seen that, in FIG. 3, the setting means (piston rod) 40 is indirectly connected with the motion transmitting member 54 by way of the hydraulic transmission including the cylinder 36 and the cylindrical actuating device 50. The ratio of such transmission is determined by the diameters of bores in the parts 36 and 50. The purpose of the breather hole 44 is to further ensure that any changes of zero position of the member 54 are transmitted to the piston rod (setting means) 40 whenever the piston 38 moves past such hole. A rise of pressure in the plenum chamber 46 of the cylinder 36 during the initial stage of disengagement of the clutch 4 (subsequent to last movement of the piston 38 to the left and beyond the hole 44) is possible only upon completed movement of the piston 38 to the right and beyond the hole 44. Each "breathing" operation entails an automatic correction of the zero position $s_0$ of the clutch 4.

If the power train is equipped with the breather arrangement of FIG. 3 or with an equivalent but purely mechanical arrangement, the instantaneous rotational speed-dependent change $\Delta s_2$ of the zero position of the clutch 4 (see 2. hereinabove) can be expressed as follows:

$$\Delta s_2 = b_2 \times n_M 2 + b_1 \times n_M - (b_2 \times n_s 2 + b_1 \times n_s) \quad (4)$$

wherein $n_s$ is the rotational speed of the engine during the last (such as immediately preceding) equalizing or breather operation (breather rotational speed). Such breather undertakings are effected, in a manner known per se, in actual use of the motor vehicle, in response to the development of predetermined operating conditions. Reference may be had to commonly owned U.S. Pat. No. 5,632,706 granted May 27, 1997 to Burkard Kremmling et al. for "MOTOR VEHICLE WITH ELECTRONIC CLUTCH MANAGEMENT SYSTEM".

In the immediately preceding equation (4), the bracketed term denotes those necessary corrections of zero position of the clutch which are ascertained at the test stand and constitute a reduction to an extent corresponding to the adjustment achieved as a result of the breather operation.

The overall correction for the purpose of compensating for rotational speed-dependent changes of the required movement carried out by the clutch adjusting member can be expressed as follows:

$$\Delta s = \Delta s_1 + \Delta s_2 \text{ or} \quad (5)$$

$$\Delta s = a_2 \times n_M^2 + a_1 \times n_M + b_2 \times n_M^2 + b_1 \times n_M - (b_2 \times n_s^2 + b_1 \times n_s),$$

wherein the preceding equation can also be written in the form $$\Delta s = a \times n_M^2 + b \times n_M - (b_2 \times n_s^2 + b_1 \times n_s)$$

5. Minimal torque consideration.

The aforedescribed corrections ensure that the clutch actuator 16 is invariably active because, as a rule, the rotational speed of the engine is practically never constant.

In order to minimize stressing of the clutch actuator 16, only those corrections which correspond to the second term of $\Delta s_2$ at 4. above (namely $\Delta s_3 = -(b_2 \times n_s 2 + b_1 \times n_s)$ are carried out within those ranges of operation when the control unit (14) selects, in dependency upon the operational parameters of the power train, a minimal clutch torque which is below a predetermined (threshold) torque. This ensures that, when the regulation takes place within the range of a minimum torque (for example, creeping function), the actuator is maintained in a position of standstill corresponding to the desired position s of the control torque characteristic curve but is corrected to an extent carried out during the last breather operation.

Additional possibilities of reducing the load upon the clutch actuator include the following:

A correction or change of the required movement takes place only when the correction value Δs exceeds a preselected threshold value.

A correction takes place only under certain circumstances of use of the motor vehicle when an exact clutch management is highly necessary in order to enhance the comfort at a pronounced acceleration, for example, during starting and/or during engagement of the clutch following a gear shifting operation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of automated clutches for use in the power trains of motor vehicles and, therefore, such adaptations should and are intended to be comprehended within the meaning and range of equivalence of the appended claims.

What is claimed is:

1. A method of compensating for the influence of changes of rotational speed of an adjustable clutch upon a control torque characteristic curve of the clutch, comprising the steps of: monitoring the rotational speed of the clutch; and varying required positions of a mobile adjusting member for the clutch in dependency upon changes of the monitored rotational speed, said required positions corresponding to said characteristic curve, wherein said control torque characteristic curve is varied as a function of changes of rotational speed and the positions of the mobile adjusting member include a zero position in which the clutch is fully engaged, said varying step including varying the zero position of the mobile adjusting member.

2. The method of claim 1, wherein said zero position varying step includes taking into consideration a mechanically effected compensation for rotational speed-dependent changes of said zero position of the mobile adjusting member.

3. The method of claim 2, wherein said changes of zero position are carried out as a function of first and second powers of the rotational speed.

4. The method of claim 1, wherein said step of varying said required positions of the mobile adjusting member is carried out only in the course of at least one of (a) starting of a prime mover for the clutch and (b) engagement of the clutch subsequent to shifting of a clutch-driven change-speed transmission of the power train into a selected speed.

5. A power train for use in a motor vehicle, comprising: a prime mover having a variable-speed rotary output element; an adjustable clutch rotatable by said output element at a plurality of speeds; signal-transmitting sensor means for monitoring at least one variable parameter including the rotational speed of said clutch; an adjustable actuator for said clutch; and control means arranged to receive signals from said sensor means and to adjust said actuator as a function of a variable control torque characteristic curve denoting information pertaining to a required position of said actuator as a function of signals transmitted by said sensor means, said control means including means for storing information pertaining to changes of said curve as a function of changes of the speed of said clutch and means for altering said required position of said actuator at least in dependency upon said stored information, wherein said actuator comprises a motor, a cylinder having a breather hole, a piston reciprocable in said cylinder, setting means connecting said piston with said motor and arranged to repeatedly move said piston past said hole, and fluid-operated means for coupling said piston with a mobile part of said clutch, said altering means being further arranged to alter said required position of said actuator in dependency upon the rotational speed of said clutch during the last movement of said piston past said hole.

6. The power train of claim 5, wherein said fluid is a hydraulic fluid.

7. The power train of claim 6, wherein said coupling means comprises a second cylinder, a conduit connecting said second cylinder with said first mentioned cylinder, arid a second piston reciprocable in said second cylinder and connected with said mobile part of said clutch.

8. The power train of claim 5, wherein said clutch is operative to transmit a plurality of different torques and said altering means is arranged to alter said required position only as a function of that rotational speed which said clutch assumes during the last movement of said piston past said hole.

9. The power train of claim 8, wherein said altering means is arranged to effect a change Δs of said required position when the clutch transmits a smallest one of said plurality of different torques and in accordance with the equation $\Delta s = -(b_2 \times ns^2 + b_1 \times ns)$, wherein b1 and b2 are constants and ns is the rotational speed of the clutch during the last movement of said piston past said hole.

10. The power train of claim 5, wherein said altering means is arranged to effect a change Δs of said required position in accordance with the equation $\Delta s = a \times nM^2 + b \times nM - (b_2 \times ns^2 + b_1 \times ns)$ wherein a, b, b1 and b2 are constants, nM is the prevailing rotational speed of the clutch, and ns is that rotational speed which the clutch assumes during the last movement of said piston past said hole.

11. The power train of claim 5, wherein said clutch is a friction clutch.

12. The power train of claim 5, wherein said sensor means includes means for monitoring at least one of a plurality of additional parameters including the rotational speed of said output element of said prime mover, the position of a multiposition gear selecting member of a transmission arranged to receive torque from said clutch, and the position of a multiposition pedal in the motor vehicle.

13. The power train of claim 5, wherein said prime mover includes an internal combustion engine and said sensor means further includes means for monitoring suction pressure in said engine.

14. The power train of claim 5, wherein said clutch is an automated clutch.

15. The power train of claim 5, wherein said changes of speed of said clutch include rapid changes substantially in the range of one to no more than five seconds.

* * * * *